3,357,756
BEARING MEANS FOR VERTICALLY
MOUNTED MOTORS
Henri Fehr, Montmorency, France, assignor to Commissariat à l'Energie Atomique, Paris, France
Filed Aug. 9, 1963, Ser. No. 301,117
Claims priority, application France, Aug. 22, 1962, 907,477, Patent 1,338,962
3 Claims. (Cl. 308—10)

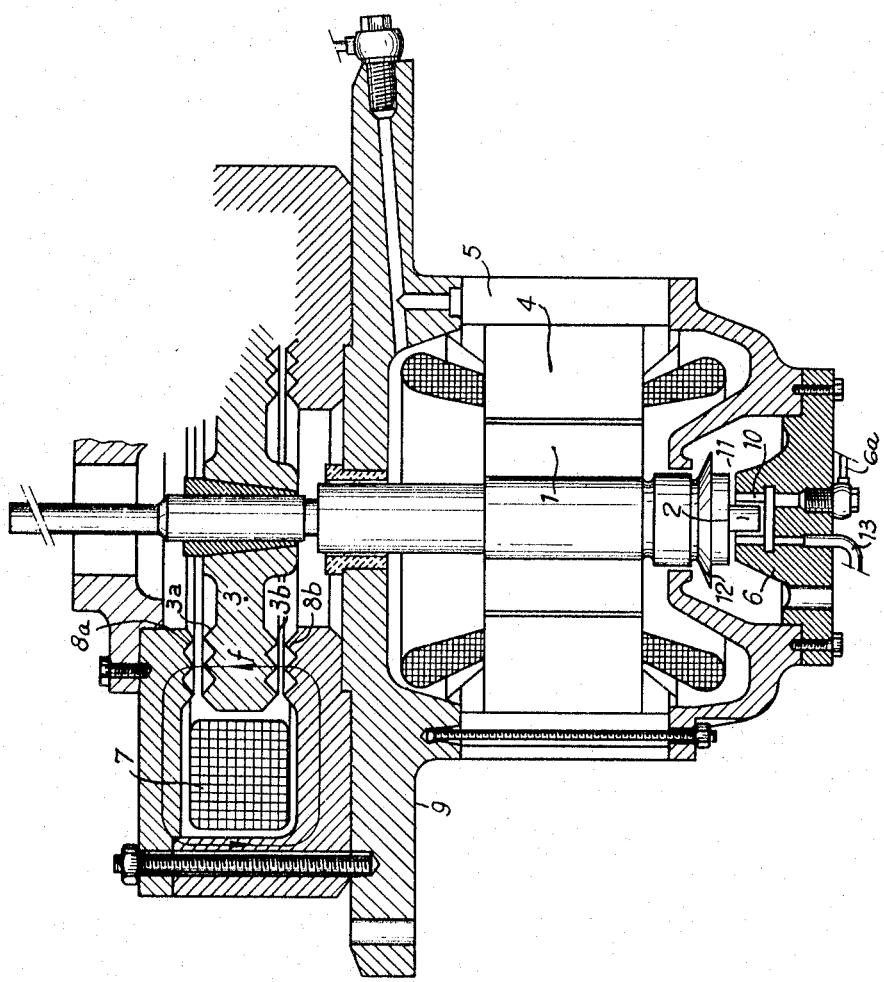

This invention relates to vertically mounted motors. Such motors exhibit instability of rotation when the clearances of conventional bearings are completely symmetrical. Furthermore, when such motors are rotating at high speed there is premature wear on the ball bearings which has led to the replacement of such bearings by oil bearings. However, in this case, the necessity to prevent any leakage from the upper bearing gives rise to complex problems.

The present invention relates to a vertically mounted motor in which a fluid pivot is situated in the lower part, where the problems of fluid tightness are easy to solve, the centering of the upper part of the axis of rotation being effected by a magnetic centering device.

More particularly, one of the features of the invention consists in that the movable part of the motor has the form of a spinning top, which ensures maximum stability.

Another feature of the invention consists in that the positive tightnesses introduced by the magnetic centering are greater in absolute value than the negative tightnesses which exist at a certain level of the axis of rotation, for example in the air gap of an electric motor, by reason of the respective positions of the pivot and of the magnetic centering member.

The invention will be more readily understood from the following non-limiting description of one embodiment of the invention in the form of an electric motor, which is diagrammatically illustrated by way of example in the single figure of the accompanying drawing.

The drawing is a diagrammatic section through an electric motor according to the invention, comprising a rotor 1 mounted on an oil pivot 2 in its lower part and comprising a magnetic centering disc 3 composed of two series of concentric circular ribs 3a, 3b.

The fixed portion of the motor comprises a stator 4 mounted in a frame 5, of which the lower part comprises the cage 6 of the pivot and its oil supply duct 6a, and of which the upper part comprises exciter windings 7 for the magnetic centering device and series of circular ribs 8a, 8b situated opposite to the ribs 3a, 3b of the movable disc 3 of the magnetic centering device connected to the rotor 1.

The magnetic centering device therefore comprises two air gaps, one of which is defined by the series of ribs 3a and 8a, and the other by the series of ribs 3b and 8b.

The lines of force for the magnetic centering follow a path such as f shown in the drawing, which passes through a magnetic material, while the portion 9 of the fixed frame of the motor separating the rotor from the magnetic centering member consists of a magnetic material.

The upper portion of the shaft of the motor may be arranged to transmit a torque in any way to a rotating machine.

The cage 6 of the oil pivot comprises a plurality of annularly disposed cylindrical peripheral grooves such as 10, which are parallel to the axis of rotation leading into a plane portion 11 performing the function of a plane fluid abutment. The pivot performs a double function. On the one hand, the resultant of the axial thrusts of the double magnetic centering member and of the weight of the movable part itself is compensated for by the pressure of the oil on the plane abutment, while on the other hand the lateral pressure in the grooves supplies at the lower level a centering of the rotating part.

An oil deflector 12 is situated above the plane abutment. A manometer tap 13 is provided for indicating the adjustment of the oil pressure at the oil pivot 2.

I claim:
1. Improved bearing means for a vertically mounted motor, comprising: a frame; a rotor mounted in said frame for rotation about a vertical axis; a fluid bearing disposed below said rotor supporting and centering the lower end of said rotor in said frame; and magnetic centering means disposed above said rotor centering the upper end of said rotor in said frame, said fluid bearing comprising a plane abutment on said frame extending substantially normal to the axis of rotation of said rotor, a cylindrical recess extending downwardly into the frame from said plane abutment, a plane surface on the lower end of the rotor opposed to the plane abutment on the frame and forming therewith a fluid thrust bearing; and a circular pivot rigid with the lower end of the rotor disposed in said recess for rotation therein and forming therewith a fluid radial bearing; said magnetic centering means comprising a magnetic centering member having at least one generally V-shaped annular rib formed thereon rigid with the upper end of said rotor and electric exciter winding means carried by the frame and disposed adjacent said magnetic centering member, said exciter means having at least one generally V-shaped annular rib formed thereon and disposed in spaced, opposed axial relationship to said rib on said centering member.

2. Improved bearing means according to claim 1 wherein said magnetic centering member is in the form of a disc having a plurality of annular, concentric generally V-shaped ribs on opposite sides thereof, and said exciter winding means includes a plurality of annular, concentric generally V-shaped ribs disposed on each side of said disc in spaced, opposed axial relationship to the ribs on said disc.

3. Improved bearing means according to claim 1 wherein grooves for the passage of bearing fluid are formed in the wall of said cylindrical recess and extend downwardly from said plane abutment parallel with the axis of rotation of said rotor.

References Cited
UNITED STATES PATENTS

| 2,012,461 | 8/1935 | Wyrick | 308—168 |
| 2,362,667 | 11/1944 | Schmidt | 310—90 |
| 2,799,227 | 7/1957 | Allen | 310—157 |
| 2,889,474 | 6/1959 | Mach | 310—90 |
| 2,998,999 | 9/1961 | Morser et al. | 310—90 |
| 3,110,525 | 11/1963 | Sternlicht | 308—178 |
| 3,154,353 | 10/1964 | Haringx et al. | 308—9 |

FOREIGN PATENTS

| 854,730 | 11/1952 | Germany. |
| 919,837 | 12/1946 | France. |
| 1,016,068 | 9/1957 | Germany. |

MILTON O. HIRSHFIELD, Primary Examiner.
J. J. SWARTZ, J. W. GIBBS, Assistant Examiners.